US011698230B2

(12) United States Patent
Lambrech et al.

(10) Patent No.: US 11,698,230 B2
(45) Date of Patent: *Jul. 11, 2023

(54) HEAT EXCHANGER WITH POROUS MATERIAL

(71) Applicant: FuelCell Energy, Inc., Danbury, CT (US)

(72) Inventors: Matthew Lambrech, Sherman, CT (US); Joseph M. Daly, Bethel, CT (US); Andrew Skok, Monroe, CT (US); Kazim Naqvi, Bethel, CT (US); Dennis Farrenkopf, Bethel, CT (US); Ling Chen, Woodbury, CT (US); Allen Adriani, Woodbury, CT (US)

(73) Assignee: FUELCELL ENERGY, INC., Danbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/504,061

(22) Filed: Oct. 18, 2021

(65) Prior Publication Data

US 2022/0034597 A1 Feb. 3, 2022

Related U.S. Application Data

(63) Continuation of application No. 16/344,544, filed as application No. PCT/US2017/058084 on Oct. 24, 2017, now Pat. No. 11,175,101.

(Continued)

(51) Int. Cl.
*F28D 15/00* (2006.01)
*F28D 15/04* (2006.01)
(Continued)

(52) U.S. Cl.
CPC ........... *F28D 15/046* (2013.01); *B23P 15/26* (2013.01); *F28D 9/0025* (2013.01);
(Continued)

(58) Field of Classification Search
CPC .... F28D 15/046; F28D 9/0025; F28D 9/0031; F28D 2021/0043; B23P 15/26;
(Continued)

(56) References Cited

U.S. PATENT DOCUMENTS

| 3,384,154 A | 5/1968 | Milton |
| 5,711,816 A | 1/1998 | Kirlin et al. |

(Continued)

FOREIGN PATENT DOCUMENTS

WO WO-2009/049397 A1 4/2009

OTHER PUBLICATIONS

International Search Report and Written Opinion for PCT/US2017/058084, dated Jan. 26, 2018 (14 pages).

*Primary Examiner* — Davis D Hwu
(74) *Attorney, Agent, or Firm* — Foley & Lardner LLP (57) ABSTRACT

A method for manufacturing a heat exchanger includes: providing a porous material that has a porosity of about 30% to about 80%; forming an oxide layer on a surface of the porous material by heat treating the porous material at a temperature in a range of 600° C. to 900° C. for a time period in a range of 8 hours to 12 hours in air; and integrating the porous material into a cold side flow passage of the heat exchanger.

21 Claims, 9 Drawing Sheets

Related U.S. Application Data (60) Provisional application No. 62/412,645, filed on Oct. 25, 2016.

(51) Int. Cl.
| | |
|---|---|
| *B23P 15/26* | (2006.01) |
| *F28D 9/00* | (2006.01) |
| *H01M 8/04007* | (2016.01) |
| *H01M 8/04119* | (2016.01) |
| *F28D 21/00* | (2006.01) |

(52) U.S. Cl.
CPC ...... *F28D 9/0031* (2013.01); *H01M 8/04007* (2013.01); *H01M 8/04067* (2013.01); *H01M 8/04126* (2013.01); *B23P 2700/09* (2013.01); *F28D 2021/0043* (2013.01)

(58) Field of Classification Search
CPC .......... B23P 2700/09; H01M 8/04007; H01M 8/04067; H01M 8/04126
USPC .................................................. 165/104.26
See application file for complete search history.

(56) References Cited

U.S. PATENT DOCUMENTS

| | | |
|---|---|---|
| 11,175,101 B2 * | 11/2021 | Lambrech ......... H01M 8/04067 |
| 2007/0267180 A1 | 11/2007 | Asfia et al. |
| 2008/0121475 A1 | 5/2008 | Bhaskara |
| 2011/0297269 A1 | 12/2011 | Pilon et al. |
| 2018/0100245 A1 | 4/2018 | Liu et al. |

* cited by examiner

HEAT EXCHANGER WITH POROUS MATERIAL

CROSS-REFERENCE TO RELATED PATENT APPLICATION

The present application is a continuation of U.S. application Ser. No. 16/344,544, filed on Apr. 24, 2019, which is a U.S. National Phase Application under 35 U.S.C. § 371 of International Application No. PCT/US2017/058084, filed on Oct. 24, 2017, which claims the benefit of and priority to U.S. Provisional Patent Application No. 62/412,645, filed on Oct. 25, 2016, the entire disclosures of which are incorporated by reference herein.

BACKGROUND

The present application relates generally to heat exchangers, and more specifically to heat exchangers for two-phase or multi-phase heat transfer. Such heat exchangers may be useful for humidifying fuel (e.g., natural gas) in fuel cell systems.

SUMMARY

An exemplary embodiment relates to a heat exchanger comprising a cold side flow passage; a porous material disposed over a surface of the cold side flow passage; and a hot side flow passage; wherein the porous material has a porosity of about 30% to about 80%.

In one aspect, in combination with any other aspect or embodiment, the porous material includes pores having diameters in a range of 1 µm to 10 µm.

In one aspect, in combination with any other aspect or embodiment, the porous material has a thickness in a range of 0.030 inches to 0.200 inches.

In one aspect, in combination with any other aspect or embodiment, the porous material comprises a metal matrix and an oxide layer on the surface of the metal matrix.

In one aspect, in combination with any other aspect or embodiment, the metal matrix is formed from at least one material selected from the group consisting of a nickel-based alloy, a chromia-forming alloy, an alumina-forming alloy, a silica-forming alloy, stainless steel, or a combination thereof.

In one aspect, in combination with any other aspect or embodiment, the oxide layer comprises at least one material selected from the group consisting of chromia, alumina, or silica.

In one aspect, in combination with any other aspect or embodiment, the porous material has a same chemical composition as the surface of the cold side flow passage.

In one aspect, in combination with any other aspect or embodiment, the heat exchanger is a plate-and-fin type heat exchanger comprising a plurality of fins forming a corrugated cross-sectional profile; a plurality of parallel plate sets, with each of the plurality of parallel plate sets including a first plate and a second plate; and a plurality of channels separating each of the plurality of parallel plate sets, wherein each of the plurality of fins are disposed between the first plate and the second plate.

In one aspect, in combination with any other aspect or embodiment, the porous material is disposed in the plurality of channels.

In one aspect, in combination with any other aspect or embodiment, the porous material comprises a sintered wick material.

Another exemplary embodiment relates to a method for manufacturing a heat exchanger comprising providing a cold side flow passage; forming a porous material to have a geometry matching a configuration of the cold side flow passage; and disposing the porous material over a surface of the cold side flow passage, wherein the porous material has a porosity of about 30% to about 80%.

In one aspect, in combination with any other aspect or embodiment, the step of forming the porous material comprises rolling a sheet of porous material to form a tube.

In one aspect, in combination with any other aspect or embodiment, the step of forming the porous material comprises cutting a sheet of porous material into strips.

In one aspect, in combination with any other aspect or embodiment, the step of forming the porous material comprises stamping a sheet of the porous material.

In one aspect, in combination with any other aspect or embodiment, the method further comprises heat treating the cold side flow passage and the porous material.

In one aspect, in combination with any other aspect or embodiment, the step of heat treating comprises heating at a temperature in a range of 600° C. to 900° C. for a time period in a range of 8 hours to 12 hours.

In one aspect, in combination with any other aspect or embodiment, the step of heat treating is conducted after the step of disposing the porous material.

In one aspect, in combination with any other aspect or embodiment, the porous material comprises a metal matrix and an oxide layer on the surface of the metal matrix.

In one aspect, in combination with any other aspect or embodiment, the porous material comprises a sintered wick material.

Another exemplary embodiment relates to a method of manufacturing any heat exchanger disclosed herein, comprising disposing a metal powder in a female mold; expanding a male form to compress the metal powder in the female mold; disposing the compressed metal powder over a surface of a cold side flow passage of the heat exchanger; and sintering the metal powder to form a porous material.

DETAILED DESCRIPTION

Heat exchangers may be used to achieve two-phase or multi-phase heat transfer, where the media being heated is a mixture that includes at least one liquid phase and at least one gas phase. Exemplary two-phase or multi-phase heat exchangers include those employed to humidify gas (e.g., gas that will be used as a fuel in a fuel cell system). These heat exchangers are often subject to material failures (e.g., fractures, cracks, undesired changes in geometry, etc.) due to high stress imposed on the pipes or other metal channels running throughout the heat exchanger from non-uniform distribution of the liquid phase within the heat exchanger. Additionally, where one or more of the liquid phases included in the media to be heated is vaporized within the heat exchanger, an undesired pulsation in flow rate through the heat exchanger may be produced due, at least in part, to fluctuations in the vaporization rate and fluctuations in the zone of vaporization. These fluctuations may further accentuate the non-uniform distribution of the liquid phase and accelerate material failures within the heat exchanger. Presently, due to such material failures, achieving a desired design life of at least twenty years and a desired uniform flow characteristic may not be possible.

The non-uniform distribution of a liquid phase in a conduit in a heat exchanger may result in local temperature gradients within the conduit, because the liquid phase generally has a greater heat conductivity than a gas phase, thereby lowering the relative temperature in areas of the conduit in contact with the liquid phase. These thermal gradients may produce stresses in the conduit as a result of uneven thermal expansion of the components forming the conduit, resulting in potential material failures of the conduit. The material failure of the conduit as a result of thermal gradient induced stresses may include cracks and fractures. Additionally, the thermal gradient induced stresses may produce changes in the geometry of the conduit. Furthermore, repeated heat cycles, for example those associated with fluctuations in the zone of vaporization, may exacerbate thermal stresses and accelerate fatigue-induced failure of the conduit.

When fluid flows at a sufficient volume through a conduit that is oriented horizontally, the conduit may be filled such that the fluid contacts the entire interior surface of the conduit. However, if the volume of fluid flowing through the conduit is not sufficiently high at a given point in time, the fluid may only contact a lower portion of the conduit but not the upper portion of the conduit. In such cases, if the fluid and the conduit are at generally different temperatures, the conduit may be subject to bending stress as heat is transferred between the fluid and the lower portion of the conduit but not between the fluid and the upper portion of the conduit. The upper and lower portions of the conduit would then be at different temperatures, forming a temperature gradient between the upper and lower portions.

Heat exchangers where a liquid phase is subjected to a phase change (e.g., vaporization) may exhibit non-uniform vapor production flow, sometimes referred to as surging. The surging may result when the liquid phase contacts a hot area of the heat exchanger and is vaporized rapidly, producing a surge of vapor. The rapid vaporization produces a surge of vapor while also removing the liquid from the area of the heat exchanger where the vaporization takes place. The vapor that is produced also prevents the immediate contact of additional liquid with the hot area of the heat exchanger. The lack of liquid in this area may cause a subsequent period of low vapor production, which allows the metal to reheat excessively as the liquid collects upstream prior to the subsequent surge. This sequence exacerbates the subsequent surge, perpetuating the surge cycle. Such a non-uniform flow of vapor is undesired as it becomes difficult to maintain a consistent vapor content in the flow, and the rapid heating and cooling cycles that result in the heat exchanger due to the surging behavior may result in material failures of the heat exchanger. Maintaining a consistent supply of liquid to the surfaces of the heat exchanger may reduce or prevent undesired surging behavior, reducing the stress leading to material failures.

The temperature difference between a fluid that is substantially static within a fully enclosed conduit (e.g., heat pipe) and the conduit itself may be substantially less than the temperature difference between a fluid that is flowing freely through the conduit and the conduit itself. Heat transferred in an enclosed conduit with a substantially static fluid may be primarily limited by the heat transfer capacity of the fluid. For example, the heat transferred from one portion of the conduit to another is limited to the heat that can be transferred through conduction from the conduit to the fluid, through the fluid, and back to the conduit at another portion. Therefore, in the enclosed conduit, temperature gradients between the fluid and conduit pipe are substantially small. In contrast, in a conduit with freely flowing fluid, the difference in temperature between the fluid and the conduit may be much greater because at least one of the conduit and the fluid may be heated or cooled relative to the other prior to the interaction of the conduit and the fluid, resulting in a much greater temperature differential. In this configuration, there is a much higher capacity for heat transfer, which also increases the material stresses on the conduit.

A conduit of a heat exchanger includes inner and outer surfaces. One of the inner and outer surfaces defines a cold side of the heat exchanger and the other of the inner and outer surfaces defines a hot side of the heat exchanger. The cold side of the heat exchanger refers to the surface (e.g., inner or outer surfaces) of the heat exchanger that a liquid phase contacts. In this configuration, the liquid phase absorbs heat from the hot side of the conduit, through the surfaces of the conduit. The hot side of the heat exchanger refers to the surface (e.g., the other of the inner or outer surfaces) of the heat exchanger configured to receive heat from a heat source, for example, a hot gas or liquid flowing thereby. Heat may be received by the hot side of the heat exchanger through conduction from contact with the hot gas or liquid. According to an exemplary embodiment, where the liquid phase passes through the conduit, the inner surface or surfaces may define the cold side of the heat exchanger. In this configuration, the outer surface or surfaces define the hot side of the heat exchanger, past which the heat source flows. Heat is then transferred from the heat source, through the outer surface (i.e., hot side) to the inner surface (i.e., cold side) and onto the liquid phase. According to another exemplary embodiment, where the liquid phase passes outside the conduit, the outer surface or surfaces may define the cold side of the heat exchanger. In this configuration, the inner surface or surfaces define the hot side of the heat exchanger, through which the heat source flows. Heat is then transferred from the heat source, through the inner surface (i.e., hot side) to the outer surface (i.e., cold side) and onto the liquid phase.

According to an exemplary embodiment, prior to the introduction of a liquid into the cold side of a conduit of a heat exchanger, the temperature difference between upper and lower portions of the conduit may be negligible or substantially non-existent. Liquid introduced to the conduit may be colder than the conduit itself, thereby cooling the surfaces (e.g., inner surface, cold side, etc.) of the conduit that the liquid contacts. For example, if the liquid is introduced to the conduit without any material for promoting annular distribution of the liquid (i.e., distribution upward along the walls of the conduit), it will contact and thereby cool the lower portion of the conduit while the upper portion of the conduit maintains substantially the same higher temperature. In this configuration, the lower portion of the conduit is at a lower temperature than the upper portion of the conduit, and therefore the lower portion contracts relative to the upper portion (i.e., the upper portion expands relative to the lower portion), causing the conduit to flex into a hogging shape (e.g., frown), such that the center expanse is higher than the rest of the conduit.

The heat exchangers described herein include a porous material disposed on the cold side surfaces of the heat exchanger. While the cold side of the heat exchanger is shown as the inner surface of the conduit, such that the porous material is received within the conduit, according to other exemplary embodiments, the cold side may be the outer surface of the conduit, such that the porous material is disposed about the outer surface of the conduit. The porous material utilizes capillary action to wick a liquid phase, producing uniform contact between the liquid phase and the cold side surfaces of the heat exchanger. The uniform contact of the liquid phase and the cold side surfaces prevents undesired thermal gradients in the heat exchanger and non-uniform vapor production flow. The heat exchangers including the porous material exhibit increased resistance to material failure, and have an expected service life of at least twenty years.

According to an exemplary embodiment, the flow rate of liquid at the cold side of the heat exchanger may be limited to a maximum value achievable before corrosion and/or erosion of the porous material begins to occur. This maximum flow rate may depend on at least one of the tube diameter or cross-sectional area, whether the flow is laminar or turbulent, liquid viscosity, pore size and/or shape, overall porosity, and the sintering process used to form the porous material. According to other exemplary embodiments, the maximum flow rate may be defined by other factors. Pressure in a portion of the heat exchanger housing the porous material may be limited to substantially the same pressure rating as the portion of the heat exchanger not housing the porous material. According to an exemplary embodiment, the cold side temperature may range from ambient to approximately 2100° F. for heating applications and the cold side temperature may range from −460° F. to ambient for cooling applications.

A porous material inserted into the cold side of a heat exchanger increases the surface area available for heat transfer as well as the residence time for cold side fluid to travel through the heat exchanger. The primary cold side flow may be oriented horizontally or vertically. In the case of a vertical orientation of a heat exchanger conduit for passing liquid therethrough, cold side flow is aided by gravity, which may lead to the liquid streaming down the conduit. In the case of a horizontal orientation of the heat exchanger conduit, however, the cold side flow is not automatically distributed annularly about the conduit, but instead held toward a bottom surface of the conduit by gravity. In this configuration, the porous material generates a capillary force that is greater than the gravitational force on the cold side liquid, thereby allowing the liquid to wet the substantially the entire circumference of the internal cold side passage in a spiral, thereby removing circumferential variation in cold side temperature.

Figure 1:
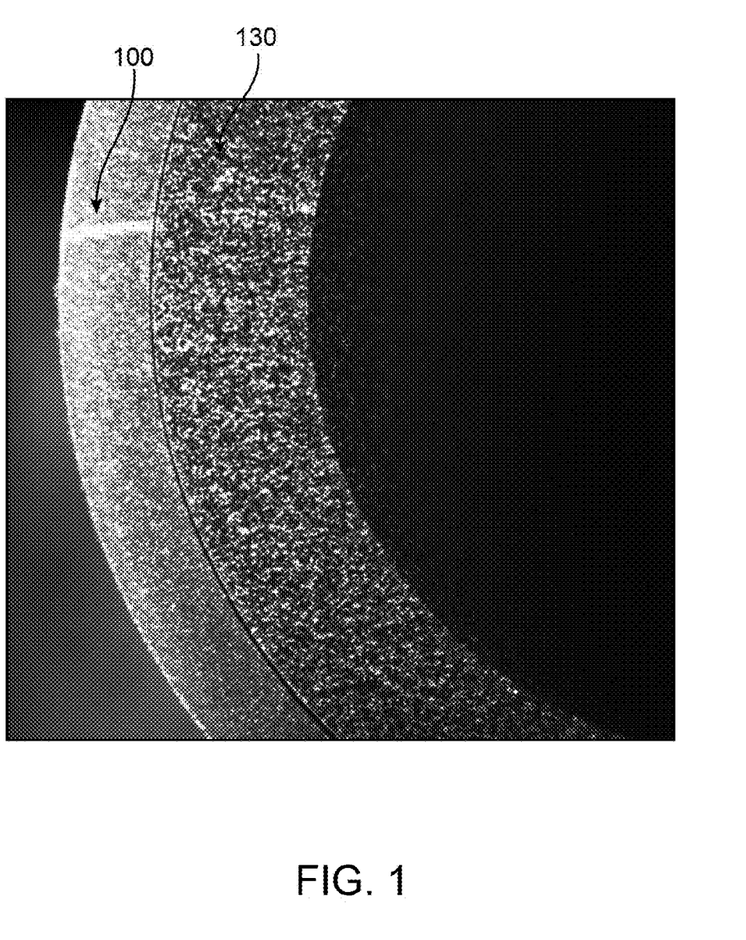
FIG. 1 is a perspective view of a heat exchanger conduit including a porous material according to an exemplary embodiment.
Figure 2A:
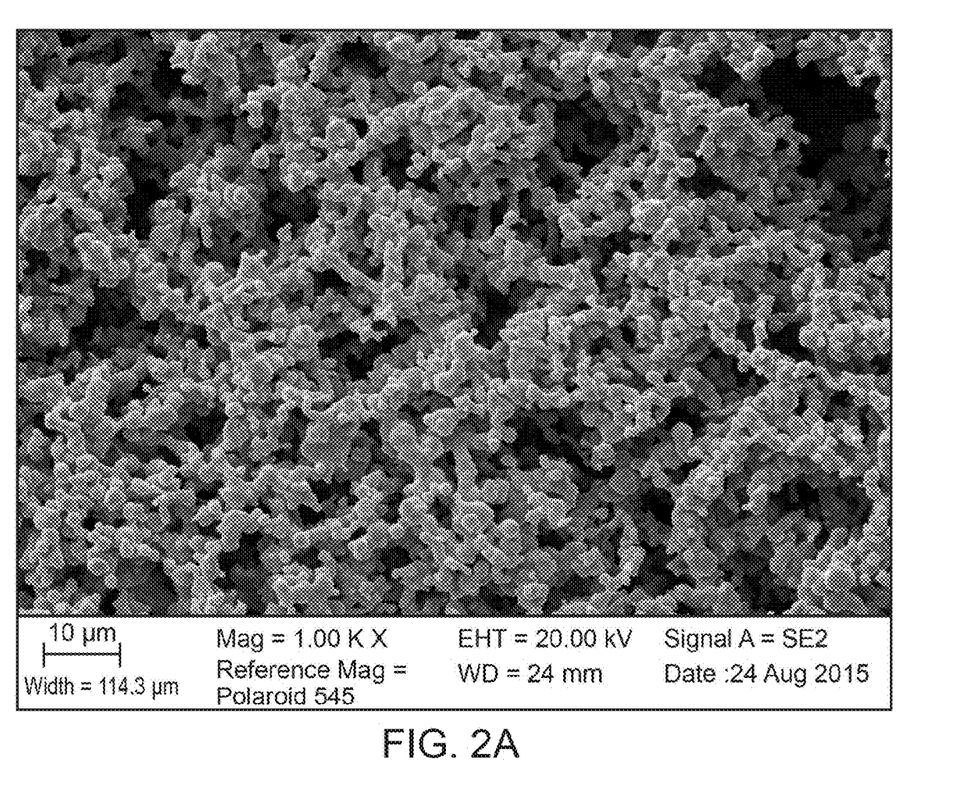
FIG. 2A is a micrograph of a porous material according to an exemplary embodiment.

The porous material includes an interconnected pore network, and capillary action within the pore network distributes the liquid phase throughout the porous material. This effect may be referred to as wicking. As shown in FIG. 1, the porous material 130 may be disposed as a layer on an internal surface of the heat exchanger that will contact the liquid phase. The interconnected pore network of the porous material is shown in FIG. 2A. The wicking behavior of the porous material allows the liquid phase to be distributed to areas of the heat exchanger that otherwise would not be contacted by the liquid phase.

The porous material may have a porosity that is capable of distributing the desired amount of a liquid phase within the heat exchanger. In some embodiments, the porous material has a porosity of about 30% to about 80%, such as about 60%. According to an exemplary embodiment, the porous material may have a porosity of between about 60% and about 80%. According to yet another exemplary embodiment, the porous material may have a porosity of between about 40% and about 90%. Porosity is defined as the total pore volume (e.g., void space) to the total geometric volume of the material. The porous material may be capable of absorbing and transporting more fluid as the porosity increases. The porosity of the porous material may be configured to promote capillary action of the liquid phase flowing in the heat exchanger. According to an exemplary embodiment, the porosity may be selected to be as high as possible without compromising the structural integrity (i.e., maintaining rigidity) of the porous material. For example, a material with a porosity greater than 80% may be structurally unstable. According to an exemplary embodiment, the porosity of the porous material may be selected to achieve a desired liquid phase flow rate in the heat exchanger. According to another exemplary embodiment, the porosity of the porous material may be selected to maintain a uniform level of saturation of the porous material with the liquid phase throughout the heat exchanger.

Figure 2B:
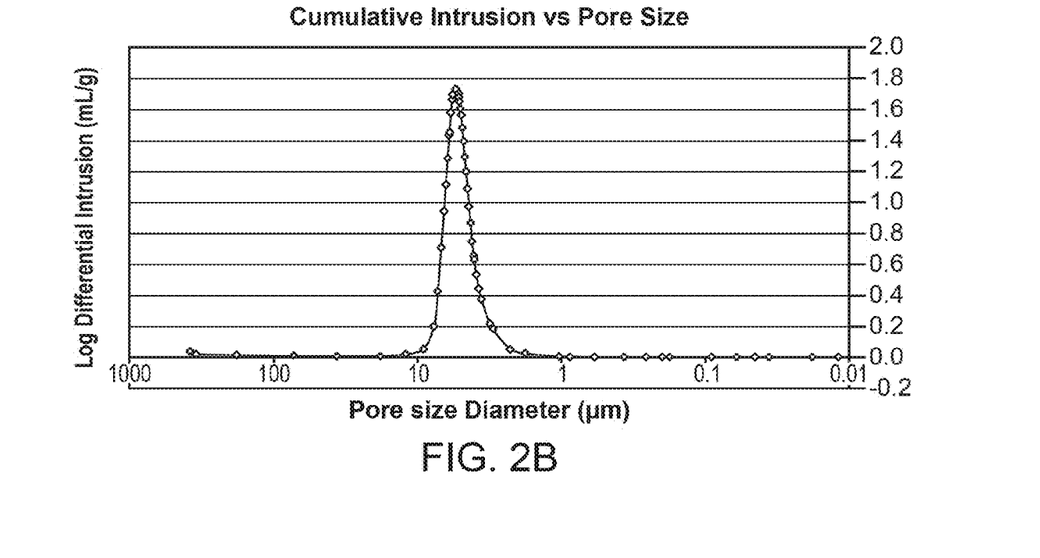
FIG. 2B is a plot showing the distribution of the cumulative intrusion vs. pore size.

The pores of the porous material may have any geometry and size capable of transporting a liquid phase through capillary action. In some embodiments, at least some of the pores may have a shape that is generally spherical and/or cuboid, with the pores being arranged in an interconnected network. According to an exemplary embodiment, the pores may have a diameter of about 1 μm to about 100 μm. Referring to FIGS. 2A and 2B, according to an exemplary embodiment, the mean pore diameter (i.e., size) may be approximately 6 μm, with pore diameters ranging substantially from approximately 1 μm to approximately 10 μm. As shown in FIG. 2A, the pore diameter may be measured by a mercury porosimetry method. In the case where the pore diameter is too large, the ability of the porous material to transport a liquid phase through capillary action may be diminished or eliminated. For example, if the pore size is too large, then the capillary force of holding the fluid may decrease.

The porous material may have any appropriate thickness within the heat exchanger. The thickness of the porous material may be selected to produce a desired liquid phase capacity within the porous material. In some embodiments, the porous material has a thickness of about 0.030 inches to about 0.200 inches, such as about 0.0625 inches to about 0.125 inches. According to an exemplary embodiment, the porous material has a thickness of about 0.0600 inches.

The porous material may include a metal material. In some embodiments, the porous material may include an alloy, such as a nickel-based superalloy or a stainless steel. According to an exemplary embodiment, the porous material includes a 300 series austenitic stainless steel. In some embodiments, the porous material includes a chromia, alumina, or silica forming alloy. In some other embodiments, the porous material may be nickel. According to an exemplary embodiment, the porous material includes grade 310 stainless steel composed of: 0.05-0.25% carbon, up to 2% manganese, up to 1.5% silicon, 24-26% chromium, 19-22% nickel, and the balance being iron. According to another exemplary embodiment, the porous material includes an alloy composed of 0.05-0.15% carbon, up to 1% manganese, up to 1% silicon, 20.0-23.0% chromium, 8-10% molybdenum, 0.2-1% tungsten, 0.5-2.5% cobalt, 17-20% iron, and the balance being nickel. In some embodiments, the porous material may have the same chemical composition as the portions of the heat exchanger on which it is disposed.

An oxide layer may be present on the surface of the porous material. The oxide layer may increase the ability of the porous material to transport a liquid phase, such as water, through capillary action. The oxide layer may be formed by oxidizing the surface of the porous material, such as by heating the porous material in air. In some embodiments, the oxide layer may include chromia, alumina, or silica.

Figure 3:
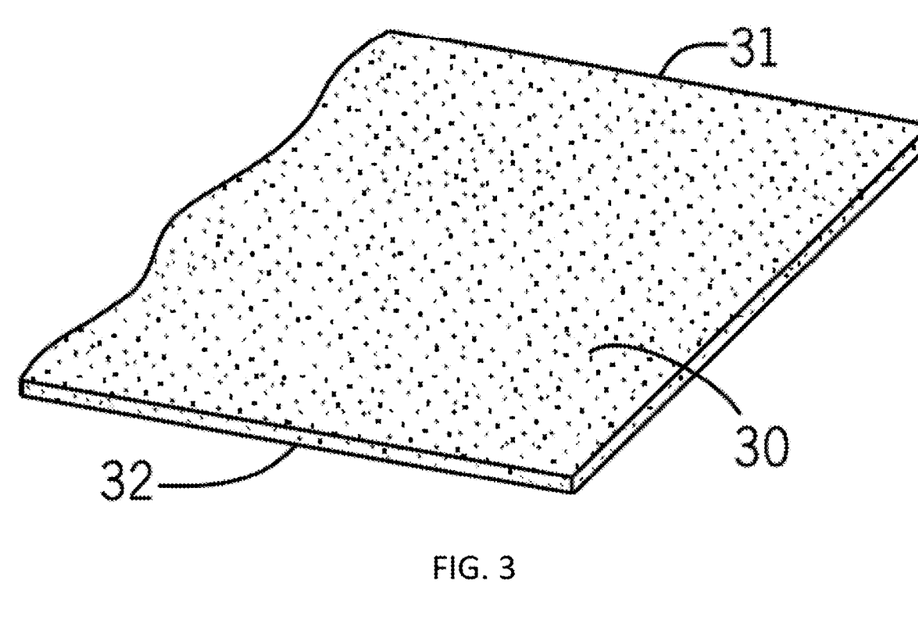
FIG. 3 depicts a sheet of porous material according to an exemplary embodiment.

The porous layer may be obtained in the form of a sheet, as shown in FIG. 3, or produced by sintering a powder. In some embodiments, sheets of porous material may be processed to achieve a desired geometry and properties. According to an exemplary embodiment, the sheet of porous material may be rolled and then inserted into a conduit of the heat exchanger. In some other embodiments, the sheet of porous material may be cut into strips and disposed in corresponding channels of a heat exchanger. In some embodiments, the porous material may be stamped or bent to form a geometry corresponding to the desired geometry of the heat exchanger.

Figure 4:
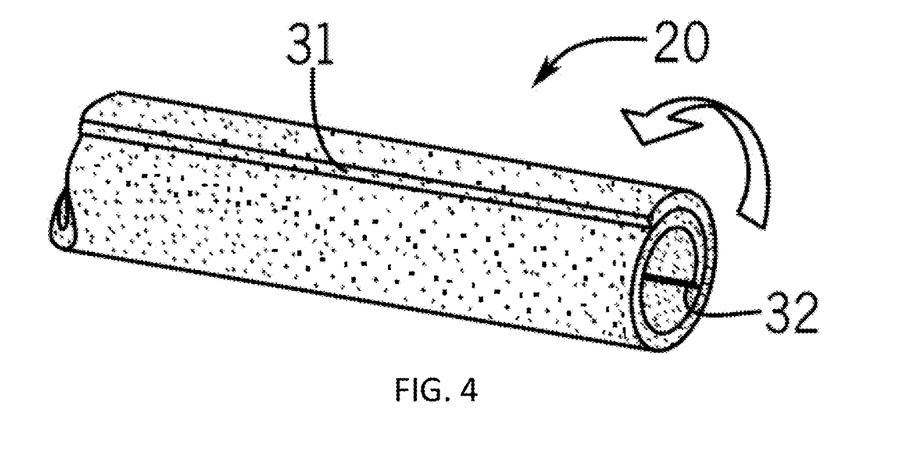
FIG. 4 shows the sheet of porous material of FIG. 3 formed as a tube in a compressed state.
Figure 5:
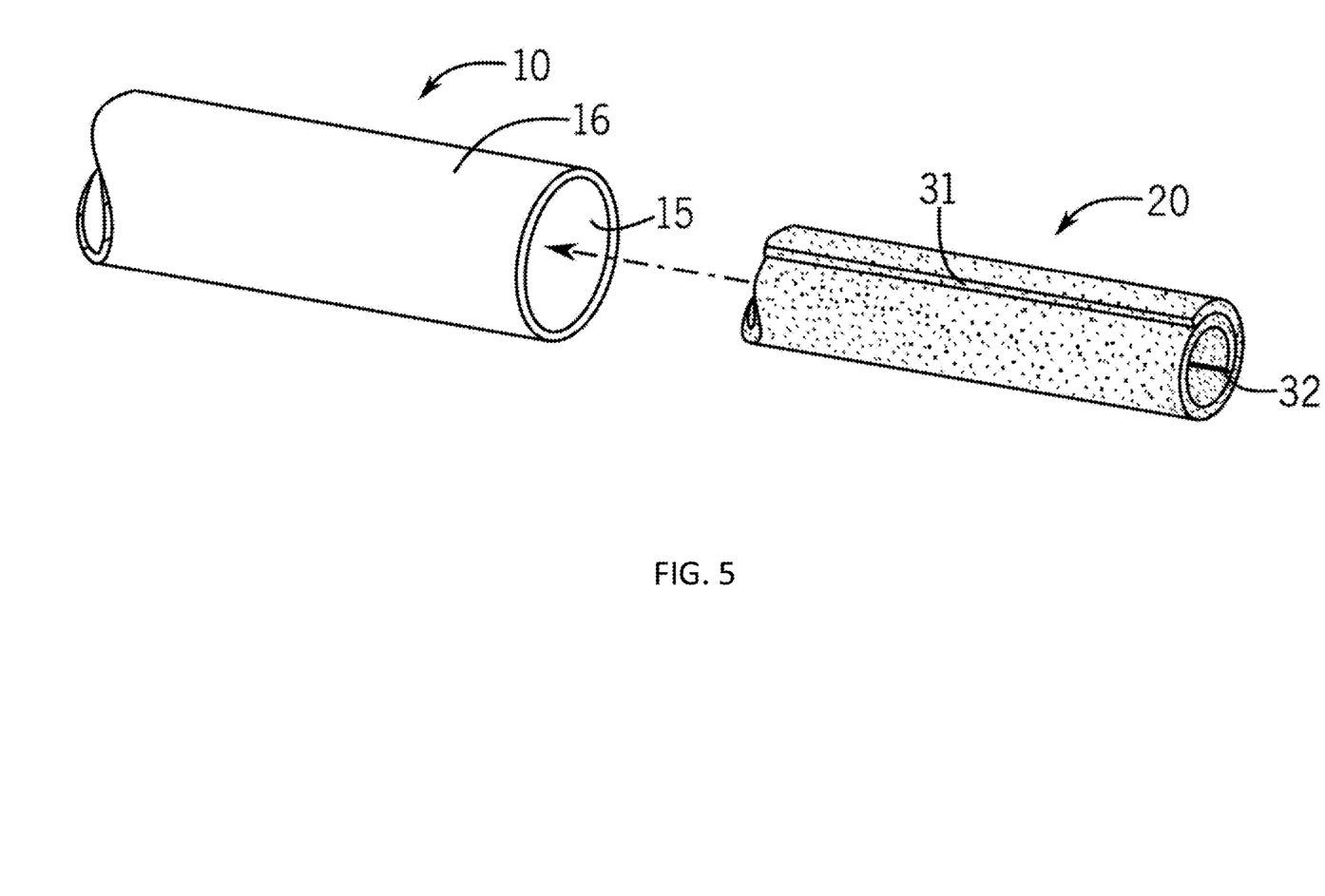
FIG. 5 depicts the compressed tube of FIG. 4 being inserted into a conduit for a heat exchanger.
Figure 6:
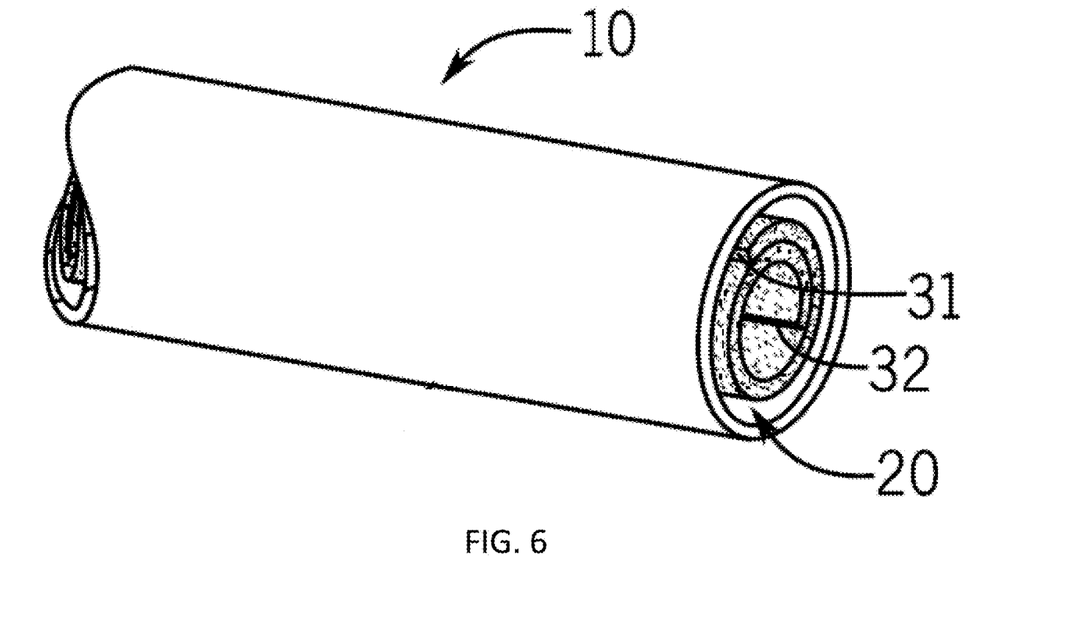
FIG. 6 depicts the compressed tube of FIG. 4 positioned within the conduit of FIG. 5.
Figure 7:
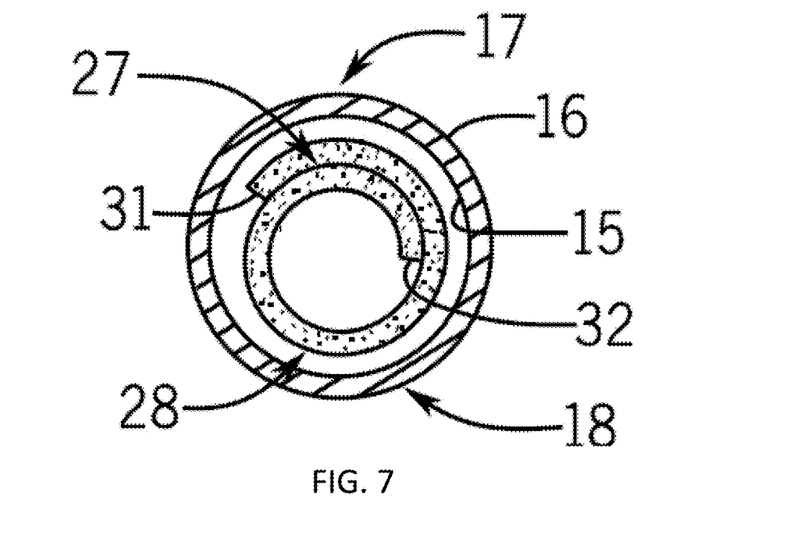
FIG. 7 is a cross-sectional view of FIG. 6.
Figure 8:
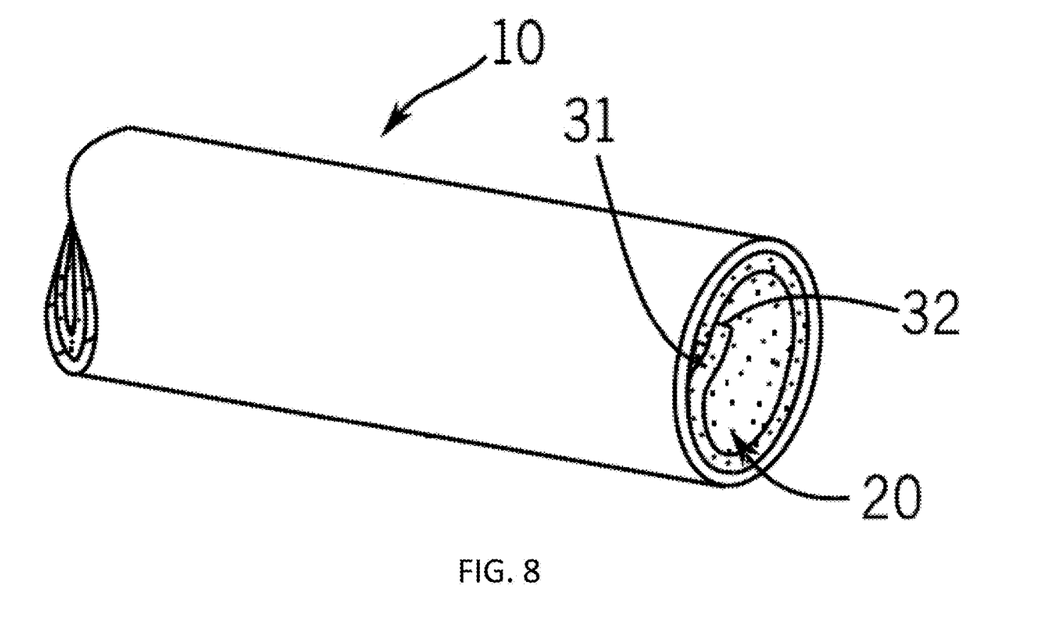
FIG. 8 depicts FIG. 6 with the tube in an uncompressed state.
Figure 9:
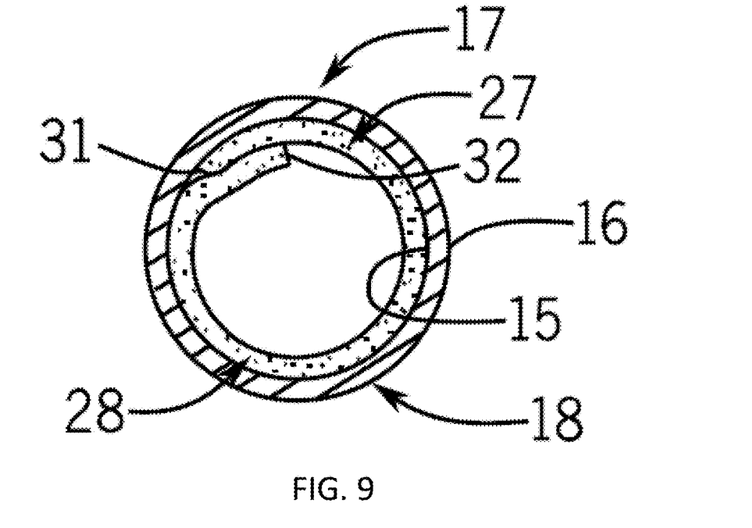
FIG. 9 is a cross-sectional view of FIG. 8.

Referring now to FIGS. 3-9, the formation and assembly of the porous material and the conduit 10 is shown according to an exemplary embodiment. As shown in FIGS. 3 and 4, a tube 20 is formed from a sheet 30 of the porous material. The sheet is rolled into a generally tubular (i.e., cylindrical) form. The sheet 30 has a first edge 31 and an opposing second edge 32. When the sheet 30 is rolled, the first edge 31 overlaps the second edge 32, placing the rolled sheet 30 in compression, such that the rolled sheet 30 is configured to unroll (i.e., uncoil, rebound, decompress) at least part way if released. In this configuration, the rolled sheet 30 has a diameter less than a diameter of the conduit 10. As shown in FIG. 5, the tube 20 is inserted axially into an end of the conduit 10 and received therein. According to other exemplary embodiments, the tube 20 may be received in the conduit 10 in other ways. FIGS. 6 and 7 show the tube 20 in the conduit 10 before it is released. In this configuration, the tube 20 may not engage the conduit 10 and may be moved axially within the conduit 10. After the tube 20 is released, it unrolls in part, establishing a compression fit within the conduit 10 as shown in FIGS. 8 and 9. According to other exemplary embodiments, the tube 20 may be coupled to the pipe 10 in other ways (e.g., bonded, welded, riveted, bolted, etc.).

According to an exemplary embodiment, a width of the sheet 30 defined between the first and second edges 31, 32 may be selected such that the first and second edges 31, 32 touch when the tube 20 engages the conduit 10. For example, the width of the sheet 30 may be substantially the same as a circumference of the inner surface 15 of the conduit 10. According to another exemplary embodiment, the first and second edges 31, 32 may overlap when the tube 20 engages the conduit 10. For example, the width of the sheet 30 may be greater than the circumference of the inner surface 15 of the conduit 10. According to another exemplary embodiment, the tube 20 does not include a complete annular surface (e.g., has an upper portion 27 but not a lower portion 28), and the first edge 31 does not contact (i.e., engage) the second edge 32 when the tube 20 engages the conduit 10. For example, the width of the sheet 30 may be less than the circumference of the inner surface 15 of the conduit 10. In this embodiment, the first and second edges 31, 32 may not overlap when the sheet 30 is rolled. The tube 20 is disposed along and configured to engage the upper portion 17 of the conduit 10, such that when it is released, it forms a compression fit with the upper portion 17. According to other exemplary embodiments, the tube 20 may be oriented within the conduit 10 in other ways (e.g., fully engaging the lower portion 18, but not the upper portion 17, etc.).

Figure 10:
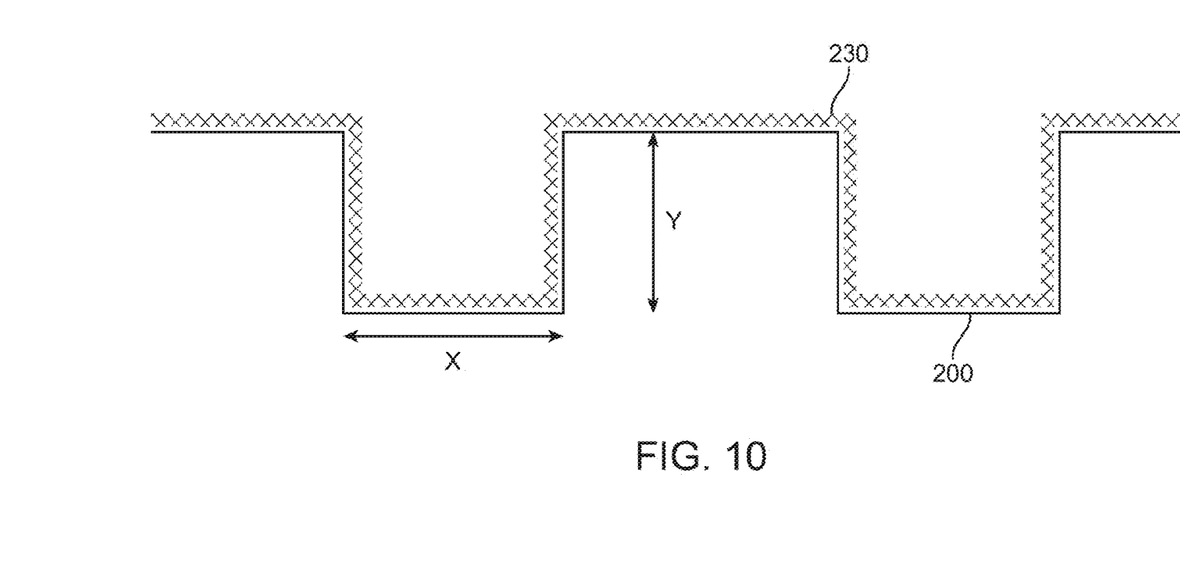
FIG. 10 depicts a fin type heat exchanger including a porous material according to an exemplary embodiment.

According to another embodiment, the porous material may be formed to match the geometry of the heat exchanger by a stamping or other forming process. As shown in FIG. 10, a plate-and-fin type heat exchanger 200 may have a corresponding porous material 230 over the surface thereof. The heat exchanger 200 and the porous material 230 may be formed separately and then assembled, or assembled and then formed together. For example, a flat plate and a sheet of porous material may be assembled, and then stamped together to form a fin geometry. Alternatively, the porous material and the heat exchanger may be stamped separately and then assembled. As shown in FIG. 10, a plate/fin type heat exchanger includes fins with a channel width X of about 0.25 inches to about 2 inches and a fin height Y of about 0.01 inches to about 2 inches.

Figure 11:
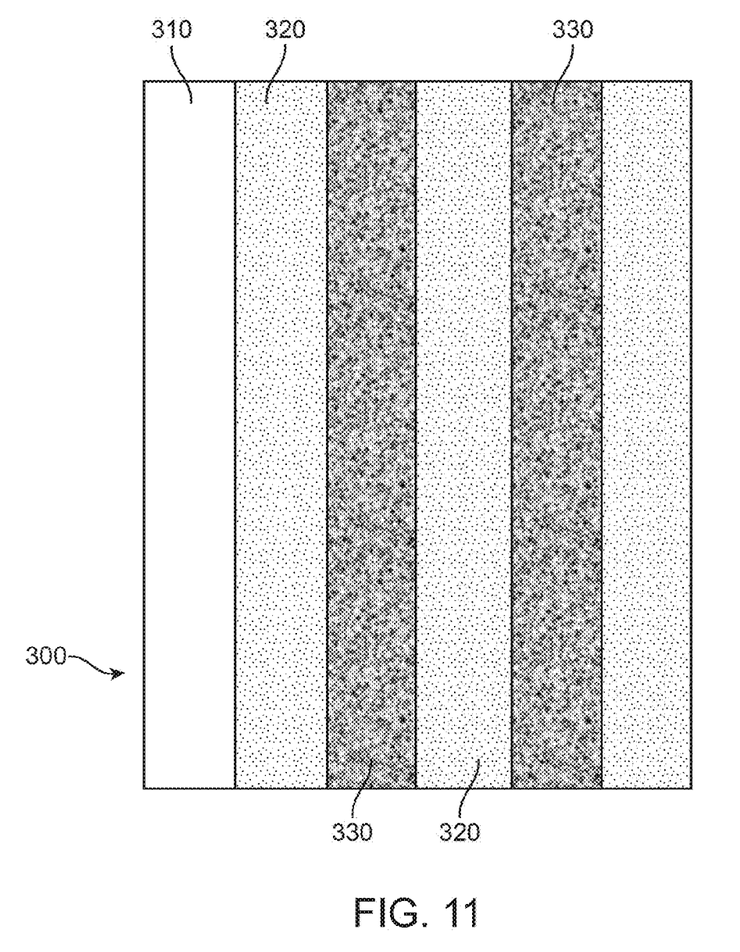
FIG. 11 depicts a plate-and-fin type heat exchanger including a porous material according to an exemplary embodiment.

According to another embodiment, the porous material may be cut into strips for insertion into the appropriate portions of the heat exchanger. As shown in FIG. 11, strips of the porous material 330 may be inserted in cold side flow channels 310 (i.e., passages, voids, etc.) of the heat exchanger 300. The porous material 330 may occupy some or all of the annular space in the cold side flow channels 310. The hot side flow channels 320 of the heat exchanger may be free of porous material. The strips of porous material may be cut by any appropriate processing method. For example, the strips may be acquired in precut sizes (e.g., length, width, height, etc.) and geometries (e.g., rectangular, cylindrical, etc.). According to another exemplary embodiment, the strips may be cut with a laser, a slitter, or other using other methods that provide a substantially precise cut, depending on the desired thickness and/or size of the strips.

Figure 12:
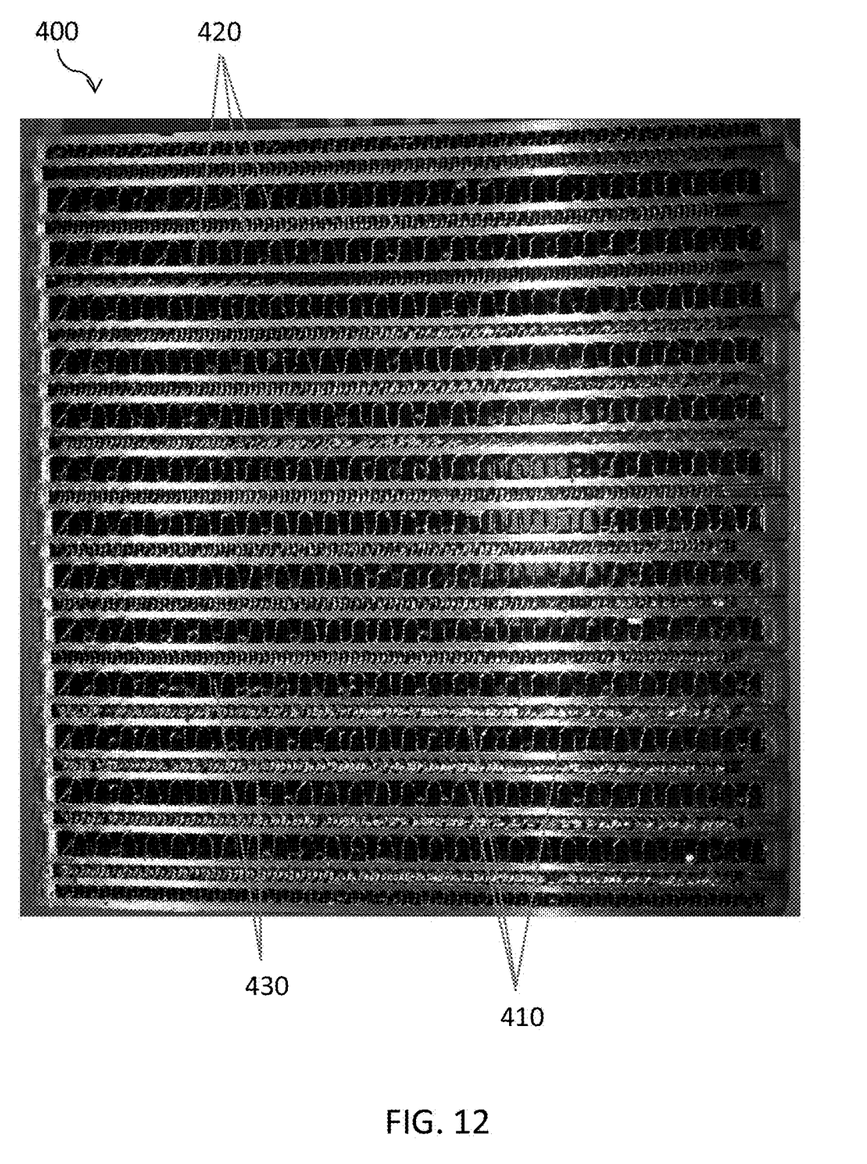
FIG. 12 depicts a cross-sectional view of a plate-and-fin type heat exchanger according to an exemplary embodiment.

Referring to FIG. 12, a plate-and-fin type heat exchanger 400 is shown according to an exemplary embodiment. The heat exchanger 400 includes a plurality of fins 410 forming a corrugated (e.g., generally serpentine) cross-sectional profile. Each fin 410 is disposed between two substantially parallel plates 420 and define a plurality of channels (i.e., passages, voids, etc.) 430 therebetween. Porous material (not shown) may be inserted into some or all of the channels 430. For example, the porous material may occupy some or all of the annular space in each corresponding channel 430. While each of the fins 410 may have substantially the same geometries, as shown in FIG. 12, the heat exchanger 400 may include fins 410 having two or more different geometries. For example, fins 410 may vary in at least one of height or spacing. Furthermore, spacing between adjacent plates 420 may vary based on the height of the corresponding fins 410 disposed therebetween.

Prior to the assembly of the porous material with the heat exchanger, the porous material may be processed to achieve the desired porosity. According to one exemplary embodiment, the porous material may be cold rolled to achieve a desired porosity and thickness before being assembled with the heat exchanger. The processing of the porous material may take place before a heat treatment that may render the porous material less amenable to processing.

The porous material may be subjected to a heat treatment for the purposes of increasing the wetting properties of the porous material for liquid water by forming an oxide layer on the porous material. The heat treatment may be conducted at a temperature of about 600° C. to about 900° C. for a time period of about 8 hours to about 12 hours in ambient air. The heat treatment may be conducted before or after assembling the porous material with the heat exchanger. The heat treatment may reduce the flexibility of the porous material. For this reason, in embodiments where the porous material is manipulated to assemble the porous material with the heat exchanger, the heat treatment should be carried out only after the assembly of the porous material with the heat exchanger. Additionally, performing the heat treatment after the assembly, the porous material may bond to the heat exchanger. In some embodiments, the heat treatment may be carried out before assembling the porous material with the heat exchanger where the flexibility of the porous material is not necessary to carry out the assembly, such as assembling strips of the porous material into the cold side flow channels of a heat exchanger.

According to another exemplary embodiment, the porous material may be formed by sintering a metal powder. A density of the powder may be selected based on the desired porosity of the tube porous material. The powder may be molded into a desired shape, and then heated to sinter the powder and form the porous material. In some embodiments, the powder is received in a mold configured to produce a porous material with the desired geometry. The porous material may be removed from the mold as a green blank, and then sintered. In some embodiments, the green blank may be assembled with the heat exchanger before sintering to form the porous material. In some other embodiments, the powder may be sintered in the mold to form the porous material.

According to an exemplary embodiment, a two piece mold system may be employed to form the porous material. A female mold may be filled with the powder, and an expandable male form may be employed to compress the powder within the female mold. In some embodiments, the shape of the female mold may correspond to or be substantially the same as the surface of the heat exchanger which the porous material will contact. The male form may be configured to form a flow passage within the porous material by compressing the powder in the female mold. For example, a tubular porous material may be formed with a cylindrical female mold and a cylindrical male form that has an expanded diameter less than the inner diameter of the female mold. In some embodiments, the female mold may be a conduit of the heat exchanger, as shown in FIG. 1.

To form a green blank, the mold system may be subjected to high pressure and the male form expanded until the powder is distributed between the form and the mold, generating a green blank with the desired geometry. The green blank may then be assembled with the heat exchanger before sintering in a high temperature furnace. The sintering may also result in the bonding of the porous material to the heat exchanger. During sintering, the porosity of the powder and the resulting porous material may remain substantially unchanged. In some embodiments, the green blank may be sintered before assembly with the heat exchanger. In these embodiments, the sintered wick material is not oxidized or heat treated. The sintered wick material does not rely on an oxidation layer to increase its wetting properties.

The heat exchangers including the porous material described herein exhibit enhanced uniformity of liquid phase distribution over the surfaces of the heat exchanger. The ability of the porous material to distribute, or wick, the liquid phase to areas of the heat exchanger that would not be contacted due solely to the flow of liquid through the heat exchanger may increases the resistance of the heat exchanger to material failure, and increases the service life of the heat exchanger. The heat exchangers are especially useful for two-phase or multi-phase heat transfer. For example, the heat exchangers may be employed to humidify fuel for a fuel cell by transferring heat to a fluid flow including a liquid water phase and a gaseous fuel phase, and may employ exhaust from a fuel cell as a heat source.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., variations in sizes, dimensions, structures, shapes and proportions of the various elements, values of parameters, mounting arrangements, use of materials, orientations, manufacturing processes, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed:

1. A method for manufacturing a heat exchanger, the method comprising:
providing a porous material that has a porosity of about 30% to about 80%;
forming an oxide layer on a surface of the porous material by heat treating the porous material at a temperature in a range of 600° C. to 900° C. for a time period in a range of 8 hours to 12 hours in air; and
integrating the porous material into a cold side flow passage of the heat exchanger.

2. The method of claim 1, wherein:
the step of providing the porous material comprises rolling a sheet of the porous material to form a tube of the porous material; and
the step of integrating the porous material into the cold side flow passage comprises inserting the tube of the porous material into the cold side flow passage to a position over a surface of the cold side flow passage.

3. The method of claim 2, wherein:
in the step of integrating the porous material into the cold side flow passage, the tube of porous material is inserted into the cold side flow passage while the tube is in compression such that a first edge of the tube overlaps a second edge of the tube, and the tube of the tube is subsequently released so as to unroll and form a compression fit within the cold side flow passage.

4. The method of claim 1, wherein:
the step of providing the porous material comprises cutting a sheet of the porous material into strips of the porous material; and
the step of integrating the porous material into the cold side flow passage comprises inserting the strips of the porous material into the cold side flow passage to a position over a surface of the cold side flow passage.

5. The method of claim 1, wherein:
the step of integrating the porous material into the cold side flow passage comprises stamping or bending the porous material into a desired geometry of the cold side flow passage.

6. The method of claim 1, wherein:
the step of forming the oxide layer on the surface of the porous material is performed after the step of integrating the porous material into the cold side flow passage of the heat exchanger.

7. The method of claim 1, wherein the porous material comprises a sintered wick material.

8. The method of claim 1, wherein the porous material comprises pores having diameters in a range of 1 μm to 10 μm.

9. The method of claim 1, wherein the porous material has a thickness in a range of 0.030 inches to 0.200 inches.

10. The method of claim 1, wherein the porous material is formed of a nickel-based alloy, a chromia-forming alloy, an alumina-forming alloy, a silica-forming alloy, stainless steel, or a combination thereof.

11. The method of claim 1, wherein the oxide layer is formed of chromia, alumina, or silica.

12. The heat exchanger of claim 1, wherein the porous material has a same chemical composition as the cold side flow passage.

13. The method of claim 1, wherein:
the step of providing the porous material comprises disposing a metal powder in a female mold, and expanding a male form to compress the metal powder in the female mold; and
the step of integrating the porous material into the cold side flow passage comprises disposing the compressed metal powder over a surface of the cold side flow passage, and sintering the metal powder to form the porous material.

14. A heat exchanger comprising:
a cold side flow passage;
a hot side flow passage;
a porous material disposed over a surface of the cold side flow passage, wherein the porous material has a porosity of about 30% to about 80%; and
an oxide layer formed on a surface of the porous material.

15. The heat exchanger of claim 14, wherein:
the oxide layer is an oxide layer formed by heat treating the porous material at a temperature in a range of 600° C. to 900° C. for a time period in a range of 8 hours to 12 hours in air.

16. The heat exchanger of claim 14, wherein:
the porous material comprises a sintered wick material.

17. The heat exchanger of claim 14, wherein the porous material comprises pores having diameters in a range of 1 μm to 10 μm.

18. The heat exchanger of claim 14, wherein the porous material has a thickness in a range of 0.030 inches to 0.200 inches.

19. The heat exchanger of claim 14, wherein the porous material is formed of a nickel-based alloy, a chromia-forming alloy, an alumina-forming alloy, a silica-forming alloy, stainless steel, or a combination thereof.

20. The heat exchanger of claim 14, wherein the oxide layer is formed of chromia, alumina, or silica.

21. The heat exchanger of claim 14, wherein the porous material has a same chemical composition as the cold side flow passage.

* * * * *